March 24, 1970 T. G. BROWN, JR 3,502,808

DATA EXCHANGE COMPATIBLE WITH DIAL SWITCHING CENTERS

Filed Dec. 27, 1965 3 Sheets-Sheet 1

INVENTOR.
THOMAS G. BROWN, JR.
BY Charles L. Johnson Jr.
ATTORNEY

INVENTOR.
THOMAS G. BROWN, JR.
BY Charles L. Johnson Jr.
ATTORNEY

March 24, 1970 T. G. BROWN, JR 3,502,808

DATA EXCHANGE COMPATIBLE WITH DIAL SWITCHING CENTERS

Filed Dec. 27, 1965 3 Sheets-Sheet 3

INVENTOR.

THOMAS G. BROWN, JR.

BY Charles L. Johnson Jr.

ATTORNEY

United States Patent Office 3,502,808
Patented Mar. 24, 1970

3,502,808

DATA EXCHANGE COMPATIBLE WITH DIAL SWITCHING CENTERS

Thomas G. Brown, Jr., Ridgewood, N.J., assignor to International Telephone and Telegraph Corporation, a corporation of Delaware Filed Dec. 27, 1965, Ser. No. 527,404
Int. Cl. H04l 5/24
U.S. Cl. 178—53.1 5 Claims

ABSTRACT OF THE DISCLOSURE

An apparatus for automatically signalling between a pulse signal data exchange and a device such as a circuit switched network, wherein for the assembly and disassembly of signals on a bit-at-a-time basis, dial and control pulses under program control interconnect a pulse signal exchange with a circuit switched network such as Telex.

This invention relates generally to communication switching apparatus and more particularly to apparatus for automatically signalling between a pulse signal data exchange and a device such as a circuit switched network.

In the field of communication switching it is often desirable to switch not only between the stations within a network but to call and switch to stations outside a network such as present in a second network. It is known to manually call and interconnect two systems by the use of an operator.

It is an object of this invention to provide apparatus for automatically generating dial signals for establishing interconnection between at least two communication networks.

It is a further object of the invention to provide apparatus for automatically switching between communication networks in which at least one network is established for the assembly and disassembly of signals on a bit-at-a-time basis.

A feature of the invention includes provisions for transmitting dial and control pulses under program control for interconnecting a pulse signal exchange with a device, one example of which is a circuit switched network.

Another feature of the invention is the use of temporary storage registers to receive and transmit characters in a bit-at-a-time manner.

Accordingly, the apparatus provided is concerned with a switching center in a private network where this center must also communicate with an existing circuit-switched network (i.e. Telex, TWX, etc.). The apparatus according to the invention must have the capability to generate the appropriate signals to and accept the appropriate signals from the circuit-switched network. The private networks internally use start-stop telegraph signals, while the circuit-switched network signals are of a different nature such as dial pulses, revertive pulses, and steady levels. The pulse data signal exchange apparatus automatically interconnects to the circuit-switched network to handle these signals.

These and other objects and features of the invention are set forth more fully in the following description and drawings which are hereby made a part of the specification and in which.

The invention is primarily concerned with apparatus for automatically interconnecting a pulse signal exchange with a circuit switched network. A circuit switched network as used herein is intended to mean any network in which interconnection between stations within the network are switched in response to address signals which incudes such well-known systems commercially designated as Telex, TWX and others.

The invention is also concerned with a pulse signal exchange having a bit-at-a-time assembly and disassembly system in which interconnection between the pulse signal exchange and a switched network is accomplished by means of transmitted dial pulses under program control. The term assembly-disassembly as used herein refers to: assembly as the process of converting a serial stream of incoming data bits on one line into a complete character in parallel, and disassembly as the reverse process which is used for output transmission to a line.

Equipment which serves as a switching center for telegraph lines, using "bit-at-a-time assembly and disassembly," is described in the pending application of T. G. Brown, Jr. entitled Pulse Signal Exchange, which bears Ser. No. 325,313, having been filed Nov. 21, 1963. That application is concerned primarily with handling start-stop telegraph signals. This invention in part is concerned with an extension of that teaching in which the communication lines carry, not only start-stop telegraph signals, but also dial pulses and certain other pulses and steady signal levels to establish the desired interconnection between two telegraph machines in a large network. After the connection is established, the two machines may exchange data by means of the usual start-stop signals. The two different types of signals, start-stop telegraph on the one hand, and dial and other control signals on the other, are carried over the same wires, but at different times. The equipment to be described is a switching center which is capable of handling both types of signals, using only a small amount of equipment in addition to that which would be required for handling start-stop signals alone.

Figure 1:
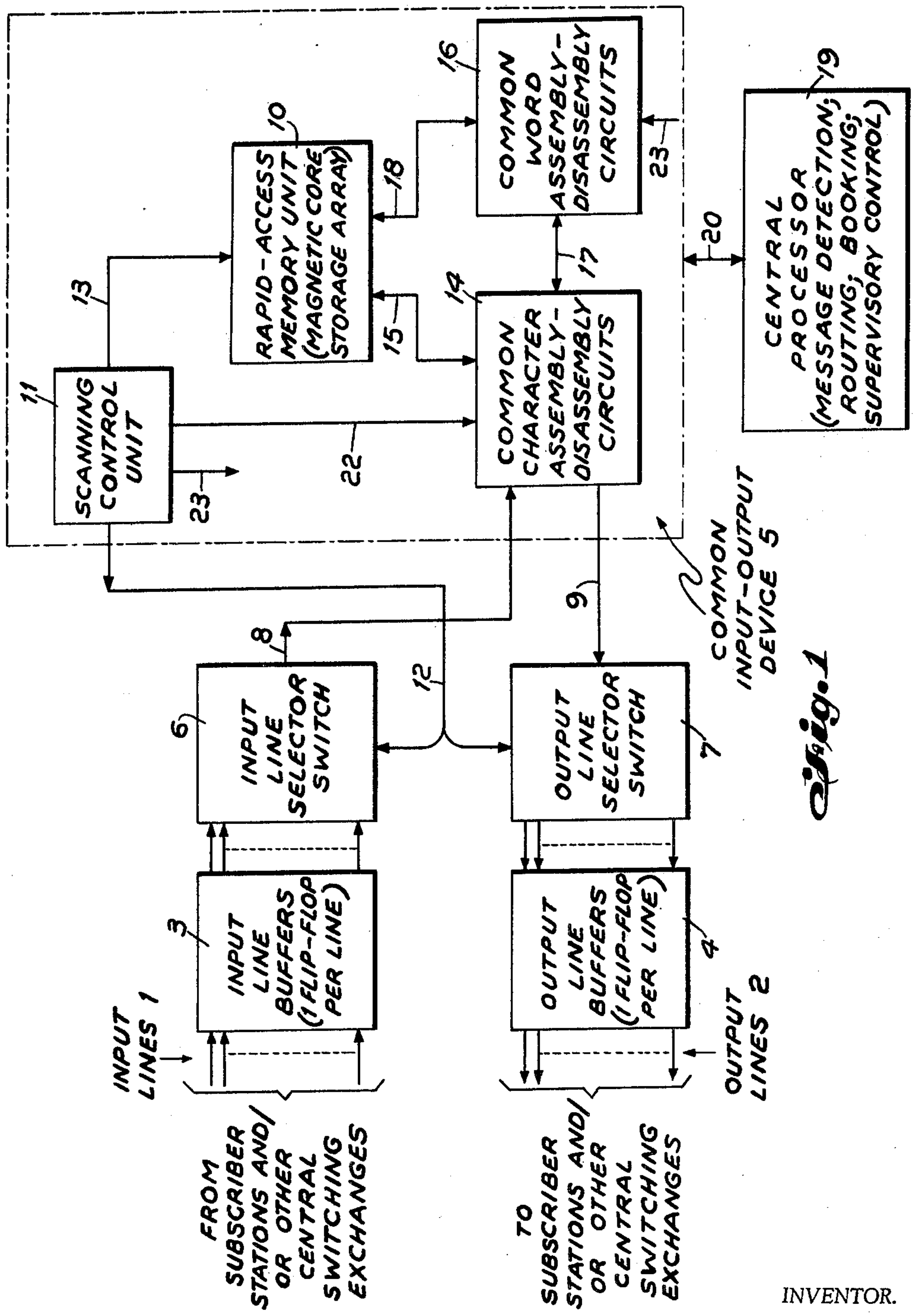
FIG. 1 is a general block diagram illustrative of the general organization of a system embodying the invention.

FIG. 1 shows in block diagram form the assembly and disassembly of signals in a bit-at-a-time manner as described fully in the previously mentioned application Ser. No. 325, 313, now Patent No. 3,366,737.

The description will be given in terms of a pulse signal data exchange which communicates by lines with a device such as a circuit switched network. Such a network, as the name implies, connects signal paths by switching circuits.

It should be noted that there are two different switching centers involved. Normally a switched network includes switching centers, interconnected by trunks, to which subscribers throughout the United States connect. Any subscriber can establish a connection to, and exchange data directly with, any other subscriber in the United States, merely by dialing the number of the called subscriber. A given subscriber may have his own private switching network which interconnects a number of his own teletypewriters, by means of his own private switching center. The private center may or may not connect into the switched network; if it does, it will do so by means of a single line from the private center into the switched network switching center. The equipment described herein is intended for the private centers, not the switched network switching center.

As now commonly used, interconnections between a particular machine in the private network and another subscriber of the switched network are not directly dialed through the private center. Several methods are possible. For example, it might be necessary to have all such calls handled by an operator at the private switching center.

The exact method used is not pertinent, except to note that (a) the private switching center must be able to transmit dial pulses to the switched network center, but (b) the private switching center does not have to receive dial pulses as they were used by the Telex center to establish the connection from the remote calling subscriber into the private center. The apparatus of the invention includes provisions for transmitting dial pulses under program control.

As was described in the aforementioned application, in the bit-at-a-time approach, a common high-speed data processor is time shared among all communication lines. This data processor operates in two different modes: (1) the normal stored-program mode, in which all operations are under the control of a program stored within the processor's memory, and (2) a wired program mode, in which the processor steps through all input and output lines performing a fixed set of operations on the various lines. A fixed memory location is utilized for each input line. The "input assembly word" register contains three fields: (1) a character assembly field, in which the incoming serial data stream from the line is assembled into a complete character, (2) a timing field, used to count off time intervals to determine when a particular action is required, any (3) a control field, which contains control or status information related to the particular input line. Whenever a given character is completely assembled, it must ultimately be transferred into a message assembly bin within the processor's memory, where the stored program can operate on it. Several different ways of accomplishing this have been used. In one form the wired-program may include provisions for keeping track of the current bin address and transfer the character directly. In another form the wired-program may merely transfer each completed character to one memory location, the input buffer word," which is permanently assigned to each individual line. Output lines are handled in a very similar manner; the principal difference being that complete characters are transferred from a message disassembly bin either directly or via an "output buffer word" to the "output disassembly word," from which the individual bits are transmitted serially.

Before describing the apparatus, it should be noted that the timing intervals involved in the dial and control signals are assumed to be compatible with those involved in the start-stop signals. If there is an incompatibility, then the equipment must be modified to provide two different time bases for the two different modes of operation. In the present application switched network equipment is considered to use a transmission speed of 50 baud, which corresponds to a nominal bit interval of 20 milliseconds, and the widths of, and intervals between, the dial and control pulses are multiples of 20 milliseconds. This compatibility allows the use of the same time base in scanning a line, regardless of which type of signal is involved at the particular time. Variations may of course be utilized.

In the start-stop type of operation described in the aforementioned application, an outgoing line can operate in either of two modes: (a) the usual start-stop mode, in which characters are transmitted together with the associated start and stop bits, and (b) the idle mode, in which the equipment merely transits a continuous Mark. An input line only operates in one mode: once a character is completed it ignores a Mark condition as long as it persists, and starts assembling a new character when a Space signal is received. In assembling the character, the start and stop bits are dropped.

In order to handle dialing and control signals, two new output modes have been added. In both of these modes, start and stop bits are not inserted. Only the actual data bits of the character are transmitted. The two new modes differ in what they transmit if a character is not made available by the program: in one mode a continuous Mark; in the other a continuous Space. For input lines only one of these new modes is used.

For convenience in the following description, the four modes have been designated as M, IS, IT, and S. Their distinguishing characteristics are tabulated as shown in Table I.

TABLE I

| | For Output Lines | | | For Input Lines | |
|---|---|---|---|---|---|
| Mode | Attempt to Obtain New Character? | Insert Start and Stop Bits? | When No Character, Transmit | Ignore A Steady | Discard Start and Stop Bits? |
| M | Yes | Yes | Mark | Mark | Yes. |
| IS | No | Yes | do | Not used. | |
| S | Yes | No | do | Not used. | |
| IT | Yes | No | Space | Space | No. |

Mode M is the normal start-stop mode, and is used to send or receive start-stop data for both switched network and non-switched network lines. Mode IS is the idle mode for a non-switched network line; it is used only for an idle output line; it is not used with a switched network line. Mode S is the signalling mode for a switched network line; it is used only on an output line, and is primarily intended for transmitting an arbitrary pattern, such as a dial pulse pattern. Mode IT is the idle mode for a switched network line; it is primarily used during the time between messages. Switched network and non-switched network lines refer respectively to signal lines which connect to the remote switched network and those which remain entirely within the private non-switched network. As indicated, mode M is always used for the purpose of sending or receiving start-stop type signals regardless of which type line is involved. However, the other modes are used for one type of line or the other, but not both.

Figure 2:
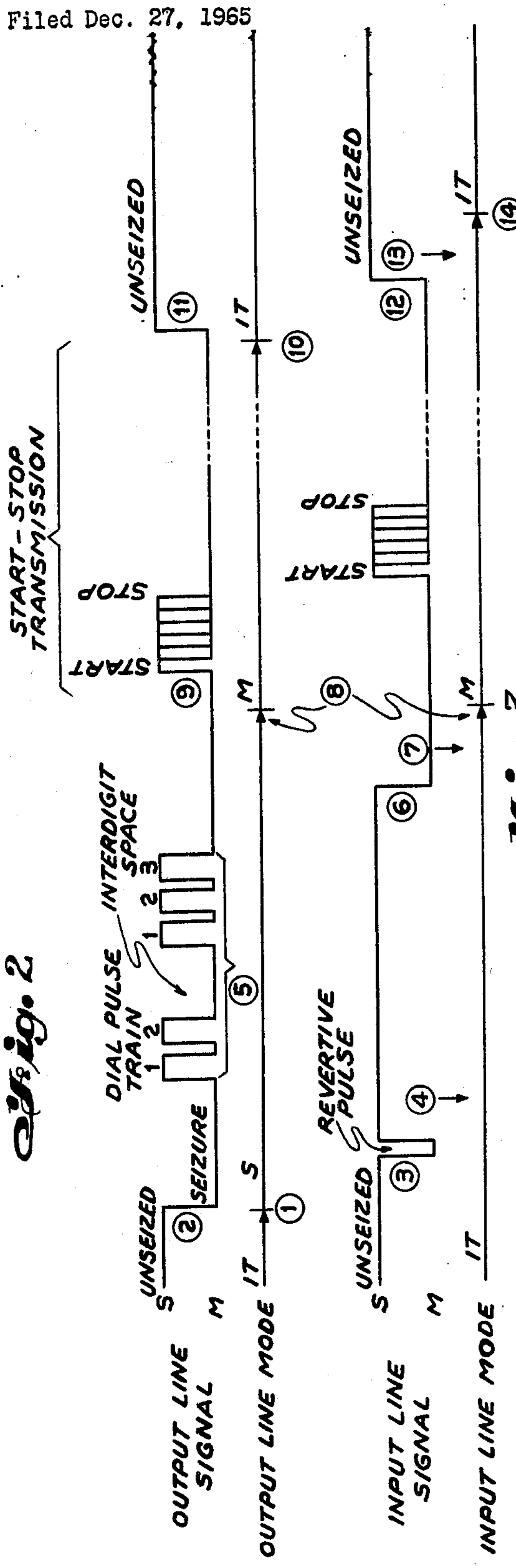
FIG. 2 is a timing diagram illustrating a transmission through a switched network switching center to a remote device having a switched network address 23 in the particular case shown.

The four modes of operation may best be understood by reference to FIGURE 2 in conjunction with Table I. The four modes are different ways in which the input-output equipment can be made to operate to deal with the signal requirements as they change in time. The usage of each mode is explained by considering the output line signal shown in FIGURE 2. As shown, the required waveform initially is a steady space. This is produced by using the IT mode, which produces a space in the absence of a character, and does not insert start and stop bits, as described in Table I. The next condition required in the example is a steady mark. This is produced by using the S mode, which generates a steady mark in the absence of a character and also does not insert start and stop bits. Later in this example there is shown an interval in which there is to be stop-start transmission (i.e. conventional telegraph signals). The M mode is used for this, since it inserts the start and stop bits, it transmits a mark in the absence of a new character, and it attempts to obtain a new character whenever one is not being transmitted. Other possible situations are also covered by FIGURE 2 and Table I.

Figure 3:
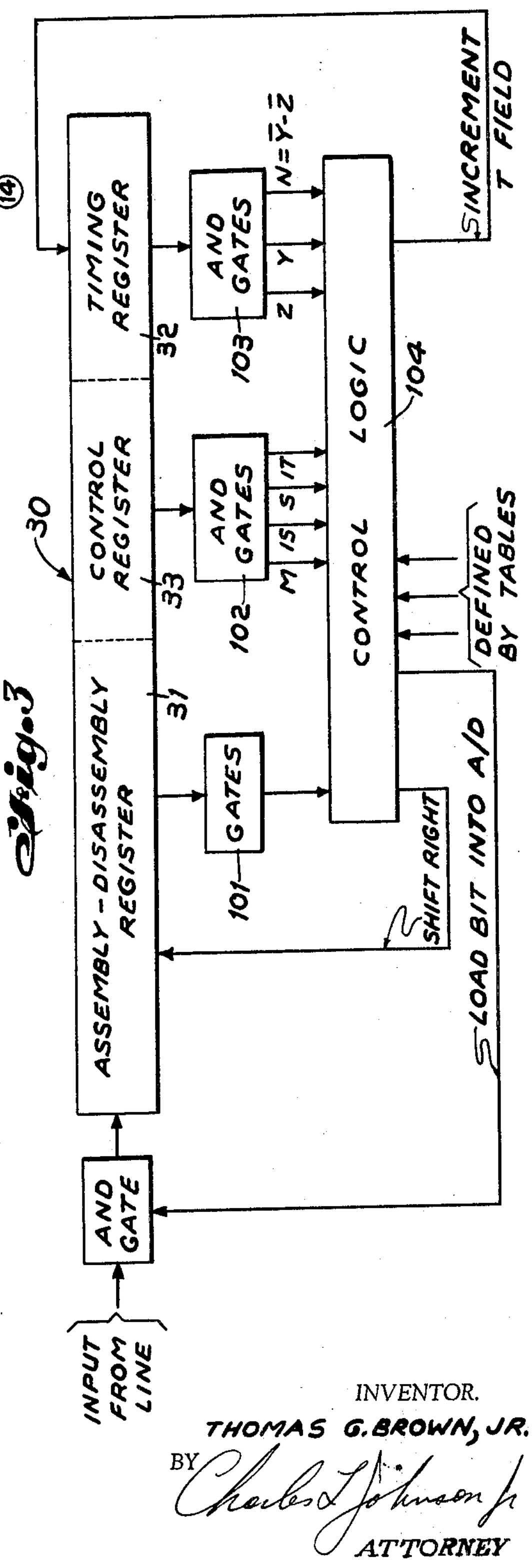
FIG 3 is a block diagram of the apparatus of the invention illustrating the interconnection of the control logic with various registers and gates.
Figure 4:
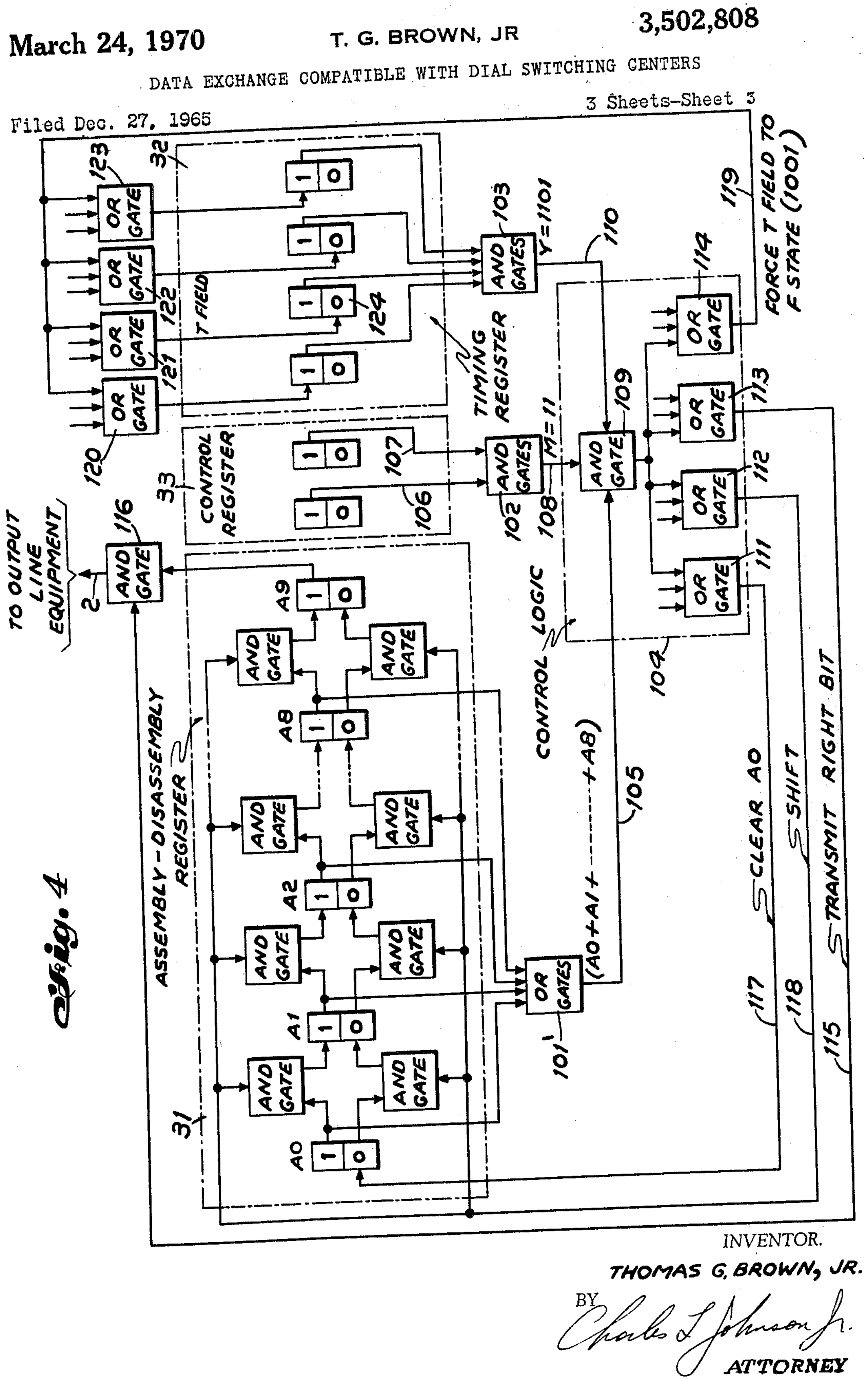
FIG. 4 is a schematic block diagram of the logic utilized in realizing the operation as set forth on line 7 of Table II.

FIGS. 2, 3, and 4 illustrate how a pulse signal exchange may automatically connect with a switched network represented by the input and output lines. It may be seen that the register means 30 includes an assembly-disassembly (A/D) register 31 in which incoming serial data from the line is assembled into a complete character. The register means 30 also includes a timing register or field 32 which counts off time intervals to determine when a particular action is required. The register 30 also includes a control portion or field 33 which contains control information related to the particular input line for control of line signals.

The assembly-disassembly register, as well as the control and timing means or registers are made up, in the preferred embodiment of one or more multistate devices, such as magnetic cores or flip-flops. The assembly-disassembly register 31 is connected by gates 101 to the control logic which acts upon a plurality of input signals to generate output transmissions of data as well as control and timing signals.

The control register 33 is connected by way of the AND gates 102 to establish the four modes of operation designated as M, IS, S and IT and to signal the control logic 104 as to the selected mode. Timing register 32 communicates through and gates 103 to establish timing control signals to the control logic 104. Control logic 104 is the control portion of device 5 of FIGURE 1, but other portions, include register 31, are used in carrying out the actions.

The control logic means 104 acts in response to the several inputs to generate signals such as shift right which shifts a signal out of the assembly-disassembly (A/D) register 31 to the output line 2, load a bit into A/D, increment the timing field or respond to other signals received from sources as defined in the Tables II, III, IV, and V.

The waveforms shown in FIGURE 2 are in accordance with some switched network standards. The information regarding the output and input line modes plus the notes has been included to show the over-all picture of what the processor does. Initially the idle or unseized condition is indicated by a steady Space in both directions. The processor sends a seizure level, steady Mark by changing the output line mode from IT to S. The switched network switching center responds by sending a "proceed to dial" revertive pulse. This is a pulse approximately 20 milliseconds wide or slightly greater. It will cause the input-output (I/O) device 5 of FIGURE 1 to assemble a character, which will contain either a single or a double Mark depending on how the pulse happens to fall with respect to the input-output scan time slots.

The processor then transmits the dial pulse train. It does so by sending the appropriate series of characters to the I/O (input-output) device 5. The standard dial pulse pattern consists of 60 millisecond Spaces separated by 40 millisecond Marks. For each dial pulse which is to be transmitted, the program sends to the I/O a character consisting of three Spaces and two Marks; since the bit interval is 20 milliseconds, this produces the desired pattern. The interdigit period is much longer and is timed by the program. Both dial pulses and start-stop data are sent to the assembly-disassembly register, but, since a particular pattern must be in the characters sent to the input-output equipment, when dial pulses are to be transmitted, start and stop bits are not inserted with dial pulses.

After the dial pulse train has been accepted by the switched network switching center and it has connected the processor through to the dialed party, the center signals the processor to proceed by going to a steady Mark condition. This will cause the I/O to assemble a character consisting of all Marks and pass it to the program. The program will then change the mode of both the input and output line to M, the normal start-stop line. Data will then be exchanged between the processor and the remote unit using start-stop signals. When the processor wishes to break the connection, it places the I/O into the IT mode, causing it to transmit a steady Space, unseized condition. The switched network switching center will break the connection to the remote unit and return to the unseized condition. This will cause the I/O to assemble a character consisting of all Spaces and pass it to the program. The program will then change the mode of the input line to IT.

The reverse process, namely a remote unit dialing to the processor, is handled in a very similar manner, except for one significant difference. The dial pulses from that remote unit are used by the switched network switching center to establish the connection; they do not go to the processor, and therefore it is unnecessary for the processor to be able to accept dial pulses. It merely has to be able to accept (a) changes in steady levels and (b) normal start-stop signals, and to transmit (a) revertive pulses, (b) changes in steady levels, and (c) normal start-stop signals. These are all accomplished in a manner very similar to that just described.

The particular pattern of input and output signals discussed above has been covered only by way of non-limiting example. Obviously other patterns, such as the use of two revertive pulses, as is sometimes done, or a rearrangement of the order of some of the steps, could be accommodated by the combination of the I/O device 5, with its 4 different modes of operation, and the associated stored-program. The above example is merely intended to show typical waveforms which might be involved and to give the over-all picture of how the combination of the wired- and stored- logic accepts and generates such wave forms. In the following section the detailed arrangement of the I/O device is described, to show how it operates in the different modes.

In all I/O device operations both those covered in the aforementioned application and the additional ones for a switched network, each input line and each output line is scanned at regular prescribed intervals. When a given line is scanned, the assembly or disassembly word assigned to that line is read out of core memory; the control and status information therein plus the line state are examined; if necessary, the control and status information are updated and a data bit may be accepted or transmitted; and then the assembly or disassembly word is restored to the core memory. If any character transfer from the assembly word to the input buffer word, or from the output buffer word to the disassembly word, is required, it is performed. The heart of the entire process is the definitions of the various steps which are performed on the assembly or disassembly word. These steps are performed while the word resides in a register in the processor. This register may be a special one reserved solely for that purpose. However, a preferred arrangement, which has been used is to use the arithmetic accumulator register part of the time for this purpose and part of the time for the usual stored-program arithmetic operations.

The actions taken when operating on an assembly or disassembly (A/D) word depends on several things: (a) the specified mode (which is determined by 2 control bits within the A/D word), (b) whether an assembly or a disassembly word is being operated on, (c) the status of the T timing field of the A/D word, (d) the status of the A, character assembly or disassembly, field of the A/D word, and (e) in the case of an assembly word, the status of the input line. These actions are shown in Tables II through V. The notation used for the various T field states is:

Z—zero state, used to denote the absence of any character.
Y—end of count state, which occurs when the end of the desired interval is reached.
N—any state other than Z or Y.
F—a state which will require a full-bit interval to be incremented to Y.
H—a state which will require a half-bit interval to be incremented to Y.
C—completed character is in A field awaiting transfer to input buffer word.

Table II covers in detail all of the steps involved in the disassembly case for all 4 possible modes of operation. Table III is "merged Action Table" derived from Table I by consolidating steps. Similarly, Table IV covers in detail all of the steps for the two possible assembly modes, and Table V is a "Merged Action Table" derived from Table IV.

In Tables II and IV note that the horizontal lines of the tables are paired. In every case the first line indicated what is contained within the A/D word when it is read out of memory; while the following line indicates what is restored to memory.

TABLE II.—DISASSEMBLY CASE

| A. Register 0123456789 | Mode | T Field | Meaning | Action |
|---|---|---|---|---|
| 0000000000 | M | Z | No character | Transmit Mark; check buffer word for a possible character. |
| 0000000000 | M | Z | | |
| jihgfedcba | M | Z | Start of character (just transferred from Buffer) | Transmit space (start bit); set T field to F. |
| jihgfedcba | M | F | | |
| ---------- | M | N | Counting an interval | Increment T field. |
| ---------- | M | N+1 | | |
| *********– | M | Y | End of interval; any bit other than stop | Transmit right bit; clear A0; shift; set T field to F. |
| 0********– | M | F | | |
| 0000000001 | M | Y | End of interval; 1 unit after beginning of stop | Transmit right bit (-1-mark-stop shift; set T field to H or F for 5-bit and 8-bit codes, respectively; clear A0. |
| 0000000000 | M | H or F | | |
| 0000000000 | M | Y | End of interval; 1.5 or 2.0 units after stop | Set T field to Z; check buffer word for possible character. |
| 0000000000 | M | Z | | |
| 0000000000 | IS | Z | No character; no transmission | Transmit Mark. |
| 0000000000 | IS | Z | | |
| 0000000000 | IS | Y | End of interval; 1.5 or 2.0 units after beginning of stop | Set T field to Z. |
| 0000000000 | IS | Z | | |
| Other cases | IS | ---------- | Same as M mode | Same as corresponding case for M mode. |
| 0000000000 | IT | Z | No character; idle TELEX | Transmit Space; check buffer word for a possible character. |
| 0000000000 | IT | Z | | |
| jihgfedcba | IT | Z | Start of character (just transferred from Buffer) | Transmit right bit; clear A0; shift; set T field to F. |
| Ojihgfedcb | IT | F | | |
| ---------- | IT | N | Counting an interval | Increment T field. |
| ---------- | IT | N+1 | | |
| *********– | IT | Y | End of interval; last 1 in character not reached | Transmit right bit; clear A0; shift; set T field to F. |
| 0********– | IT | F | | |
| 0000000001 | IT | Y | End of interval; start of last 1 in character | Do. |
| 0000000000 | IT | F | | |
| 0000000000 | IT | Y | End of interval; end of character transmission | Transmit space; check buffer word for possible character; set T to Z. |
| 0000000000 | IT | Z | | |
| 0000000000 | S | Z | No character; TELEX signalling | Transmit Mark; check buffer word for a possible character. |
| 0000000000 | S | Z | | |
| 0000000000 | S | Y | End of interval; end of character transmission | Transmit Mark; check buffer word for a possible character; set T to Z. |
| 0000000000 | S | Z | | |
| Other cases | S | ---------- | Same as IT mode | Same as corresponding case for IT mode. |

Mode: S=signalling; M=message (start-stop); IT=idle TELEX; IS=idle start-stop.
T field: Y=end of count; N=Y, Z; F=state to obtain full-bit interval; H=state to obtain half-bit interval; Z=zero (rest) state.
*Indicates that at least one of these bits is in the 1 state; –indicates "don't care".

TABLE III.—DISASSEMBLY CASE, MERGE 1 ACTION TABLE

| A Register 0123456789 | Mode | T Field | Action |
|---|---|---|---|
| 0000000000 | M+IS+S | Z+Y | Transmit Mark; set T field to Z. |
| 0000000000 | IT | Z+Y | Transmit Space; set T field to Z. |
| 0000000000 | M+S+IT | Z | Check buffer word for possible character (Note 1). |
| ********** | M+IS | Z | Transmit spaces; set T field to F. |
| ********** | S+IT | Z | Transmit bit 9; set T field to F; shift; clear A0. |
| *********– | – | Y | Do. |
| 0000000001 | S+IT | Y | Do. |
| 0000000001 | M+IS | Y [1] | Transmit space; set T field to H; shift; clear A0. |
| 0000000001 | M+IS | Y [2] | Transmit space; set T field to F; shift, clear A0. |
| ---------- | – | N | Increment T field. |

[1] (5 bit code).
[2] (8 bit code).

NOTE 1: The operations are done in two steps: first, all things other than checking the buffer word, and then checking the buffer word. The results of the first step may affect the second. For example, referring to Table I, the condition 0000000000, M, Y will result in the A/D word being changed to 0000000000, M, Z, which will in turn cause the buffer word to be checked.

TABLE IV.—ASSEMBLY CASE

| Line | A register 0123456789 | Mode | T Field | Meaning | Action |
|---|---|---|---|---|---|
| Mark | 0000000000 | M | Z | No character | None. |
| | 0000000000 | M | Z | | |
| Space | 0000000000 | M | Z | Leading edge of Start pulse | Set T field to H; complement A0–A9. |
| | 1111111111 | M | H | | |
| – | ---------- | M | N | Counting an interval | Increment T field. |
| | ---------- | M | N+1 | | |
| Mark | 1111111111 | M | Y | End of interval; false start pulse | Clear A0–A9; set T to Z. |
| | 0000000000 | M | Z | | |
| Space | 1111111111 | M | Y | End of interval; load start bit | Load bit 0/3; shift 0/3–9; set T field to F. (Note 2). |
| | ---------- | M | F | | |
| – | ########11 | M | Y | End of interval; load data bit | Do. |
| | ---------1 | M | F | | |
| – | --------01 | M | Y | End of Interval; load stop bit | Load bit 0/3; shift 0/3–9; set T field to H. (Note 2). |
| (stop) | ---------0 | M | H | | |
| – | ---------0 | M | Y | End of interval; character complete | Force bit 0 to 1; shift 0–0 set T field to C (Note 1). |
| | ---------- | M | C | | |
| Space | 0000000000 | IT | Z | Idling | None. |
| | 0000000000 | IT | Z | | |
| Mark | 0000000000 | IT | Z | Leading edge of "character" | Set T field to H. |
| | 0000000000 | IT | H | | |
| – | ---------- | IT | N | Counting an interval | Increment T field. |
| | ---------- | IT | N+1 | | |
| – | -------000 | IT | Y | End of interval; load data bit | Load bit 0; shift 0–9; set T field to F. |
| | --------00 | IT | F | | |
| – | -------100 | IT | Y | End of Interval; Load last (9th) bit | Load bit 0; shift 0–9; set T field to H. |
| | --------10 | IT | H | | |
| – | 10 | IT | Y | End of interval; load flag; complete | Force bit 0 to 1; shift 0–9; set T field to C (Note 1 above). |
| | ---------1 | IT | C | | |

↑ This is the first data bit accepted, and must inherently be a 1.

#Indicates that at least one of these bits is a zero.

NOTE 1: When the T field is in the C state, this indicates that a completed character is available. It will be transferred to the buffer word immediately, in the same scan cycle, and then the A/D word will be cleared to: 0000000000, M, Z.

NOTE 2: For an 8-bit code, it is loaded into bit 0 and shifted from 0 through 9. For a 5-bit code, it is loaded into bit 3 and shifted from 3 through 9. In the final step, bit 0 is always forced to 1 to act as a flag to the program in the buffer word. For an 8-bit character, the contents of the Buffer word will be 1Shgfedcba, where "a" through "h" are the data bits, with "a" received first, and "S" is the stop bit, which will be "1" assuming it is not garbled in transmission. For a 5-bit character, the contents of the buffer word will be 1111Sedcba.

TABLE V.—ASSEMBLY CASE, MERGED ACTION TABLE

| Line | A Register 0123456789 | Mode | T field | Action |
|---|---|---|---|---|
| Space | ---------- | M | Z | Set T field to H; complement A0–A9. |
| Mark | ---------- | IT | Z | Do. |
| - | ---------- | M+IT | N | Increment T field. |
| - | ########11 | M | Y | Load bit 0/3; shift 0/3–9; set T field to F. |
| - | -------000 | IT | Y | Load bit 0; shift 0–9; set T field to F. |
| - | --------01 | M | Y | Load bit 0/3 shift 0/3–9; set T field to H. |
| - | -------100 | IT | Y | Load bit 0; shift 0–9; set T field to H. |
| - | ---------0 | M | Y | Force bit 0 to 1; shift 0–9; set T field to C. |
| - | --------10 | IT | Y | Do. |
| Space | 1111111111 | M | Y | Load bit 0/3; shift 0/3–9; set T field to F. |
| Mark | 1111111111 | M | Y | Clear A0–A9 set T field to Z. |

Consider the sequence of steps in Table II, the disassembly case. In the case of the M mode, the normal start-stop mode, we start with the condition that no character is being transmitted. The T field is in the Z state and the A field is blank (all zeros). When the control logic finds that combination, it will take the indicated actions; namely, transmit a Mark, restore the A/D word to memory unchanged, and then check the buffer word to see if a character is available. As long as no character is available in the buffer word, each time the line is served this process will repeat, resulting in a steady Mark being transmitted.

Assume a character is now placed in the buffer word by the program. For generality the 10-bit character in the buffer word has the form jihgfedcba. In particular, the format for the two commonly used telegraph codes is shown in the following table:

| | jihgfedcba |
|---|---|
| 5-bit, 7.5 unit code | 00011edcba |
| 8-bit, 11.0 unit code | 11hgfedcba |

Bit *a* is transmitted first in time. A start bit is always transmitted prior to *a*. The 11 pattern at the end of the character is used to transmit the stop pulse, which is 1.5 units for the 7.5 unit code, and 2.0 units for the 11.0 unit code.

As shown on the third and fourth lines of Table II, when the control logic finds the T field in the Z state and finds a character in the A field it transmits a Space (the start bit), leaves the A field unchanged, and sets the T field to the F state. On the next scan cycle, shown on the fifth and sixth lines, the T field is found to be in the N state (i.e., neither the Z nor Y state), and therefore the only action is to increment the T field by 1. On each succeeding scan cycle until the T field reaches state Y, the same situation occurs. Finally a time will be reached, when it will be found that the T field is in the Y state, indicating the end of a counting interval. At this time shown on the seventh and eighth lines, the right-most bit of the A field will be transmitted, the entire A field will be shifted right one place, the left-most bit (A0) will be forced to zero, and the T field will be set to the F state.

The process of counting off time intervals and transmitting succeeding bits will continue on succeeding scan cycles in a similar manner. The remaining data bits will be transmitted. The first 1 in the 11 pattern following the data bits will also be transmitted; this will yield the first unit out of the 1.5 or 2.0 unit stop pulse. On the following scan cycle the situation will be as shown on the ninth and tenth lines. The transmission of the Mark will continue, and the T field will be set to H or F: H if the control field of the A/D word indicates that the line is using 5-bit code, and F if it indicates the use of 8-bit code. At the end of the next counting interval, the situation of the eleventh and twelfth lines occurs; the T field is restored to the Z state, and at each scan cycle the buffer word is examined to see if a new character is available.

The actions for the IS mode are identical to those for the M mode, except, as indicated, no check is made of the buffer word for a possible new character. The actions for the IT mode are listed in detail in Table II. As can be seen there are a few differences, such as (a) when no character is available, a Space instead of a Mark is transmitted, (b) no start bit is inserted, and (c) instead of performing the manipulations previously described for the stop signal, it merely transmits the bit pattern of the "character" until there are no 1's left in the A field.

It should be noted that the I/O considers the transmission of the "character" complete when it transmits the last 1 in the pattern, regardless of how many bits were actually transmitted. For example, if the character placed in the buffer word by the program were 001000110, the I/O would effectively ignore the two left-most zeros, and transmit the 8-bit pattern 1000110; after which it would start examining the buffer word for a new "character." This feature appears to place a slight restriction on the patterns which can be transmitted. However, by having proper regard for the placement of the left-most one in the various characters transmitted, and noting the relationship between successive "character" transmissions, one can generally transmit practically any arbitrary pattern. Specifically, one can readily form the patterns involved in the Telex standards.

The actions for the S mode are almost identical to those for the IT mode; the only difference is that under certain conditions a Mark is transmitted instead of a Space.

Table III contains exactly the same information as Table II, but, where possible, closely related conditions have been combined to simplify the equipment. For example, the first line of Table III represents a consolidation of the first and the next-to-last lines of the M section, the IS section, and the S section of Table II.

Table IV covers the detailed steps for the assembly case. It is mostly self-explanatory, and only a few points need explanation. First, the assembly of a character is initiated by a transition to Space on a previously idle input line. However, there is a possibility that a narrow noise spike may occur and falsely initiate the process. Therefore, as shown on the seventh through tenth lines, at the same time when the apparent start pulse should be accepted, it is checked. If the line has returned to the Mark condition, the assumption is made that a noise pulse occurred, and the A/D word is cleared back to the initial idle state. On the other hand if the line is still in the Space condition, the character assembly process is allowed to proceed.

Second, a completely assembled character will be in the form shown in the following table:

| | 0123456789 |
|---|---|
| 5-bit, 7.5 unit code | 1111Sedcba |
| 8-bit, 11.0 unit code | 1Shgfedcba |

Bit *a* is the first data bit received after the start pulse. S is the stop pulse; normally it will be a 1 (1 corresponds to Mark). In an abnormal condition it might be a 0, e.g., an open line would cause the assembly of a character 1000000000.

Third, the C state of the T field, which is used only to indicate that a completely assembled character is in the A field, is used solely to notify the control logic. It will cause control to take steps different from those which usually are required. The usual procedure is to merely transfer the A/D word from the Accumulator register back to the appropriate core memory location. Instead, in this case, control (a) modifies the A/D word in the memory buffer register by clearing the A field to the blank state and by clearing the T field to the Z state (no character), (b) stores this modified A/D word in the appropriate location, then (c) reads the appropriate input buffer word into the memory buffer register, (d) inserts the character from the Accumulator register, and finally (e) restores the buffer word to its location.

Fourth, when the leading edge of the start pulse is detected, a half-bit interval is used to reach the approximate center of the start-pulse interval. Thereafter, full-bit intervals are used to reach the approximate center of the succeeding bits.

Fifth, when the assembly process first starts, the entire A field is complemented to ones. The start bit is treated as a 0 (space=0). Then the right-most 0 of the A field is used as a flag to keep track of the assembly process.

The handling of the IT mode is similar to the M mode with a few exceptions: (a) there is no stop bit, (b) since the character is initiated by a Mark, the A field is not initially complemented, and the right-most 1 is used as the flag for keeping track of the assembly process.

Table V is the Merged Action Table derived from Table IV.

FIG. 4 schematically illustrates the operation of the invention in generating the signals illustrated in tabular form at line 7 of Table II. The * indicates that at least one of the bits A0 to to A9 is in the 1 state, so that OR gate 101 passes a signal to line 105. The Mode M is indicated by the signal from the control register 33 which passes AND gate 102 representing M equal to the 1 state on both lines 106 and 107. AND gate 102 passes a signal to line 108 which is one of three inputs to gate 109.

The timing field T is designated at Y at line 7 of Table II and as defined herein, Y=1101. As may be seen from the T field multistate devices AND gate 103 inputs representative of 1101 will yield an output on line 110 which represents one input to gate 109. The AND gate 109 output is fed as one of possibly several inputs to the OR gates 111–114 which in turn accomplish the four actions indicated in the Action column at row 7 of Table II.

Transmit right bit is thus accomplished by the signal from gate 113 acting on conductor 115 and gate 116 to transmit the A9 bit to the output line 2.

Clear A0 is accomplished by gate 111 transmitting a signal on line 117 to clear the A0 device of the register 31.

Shift is realized by gate 112 activating line 118 to shift the signals in the register 31 to the right one step.

Set T field to F occurs by gate 114 activating line 119 to feed OR gates 120–123 so that gate 121 causes multistable device 124 changes state to change the T field coding from 1101 to 1001, representative of the code F.

It is thus seen that objects and features of the invention have been accomplished by the apparatus above described and illustrated in the drawings.

While the above description of the invention set forth specific apparatus, it is to be clearly understood that this description is made only by way of example and not as a limitation to the scope of the invention as set forth in the objects thereof and in the accompanying claims.

What is claimed is:

1. In a pulse signal data exchange having a plurality of input and output lines, a memory unit with a storage cell therein for each of said lines, a means for simultaneously scanning said lines and corresponding storage cells in a predetermined multiplex scanning sequence, and means coupled to said scanning means for transferring pulse information signal elements between said lines and cells on an element-by-element multiplex basis, said means for transferring including apparatus for automatically interconnecting the data exchange with a device comprising:

assembly/disassembly register means for temporarily storing data signals and performing the operation of assembling information from serial form on a particular input line to character-parallel form and performing the operation of disassembling information from character parallel form to serial form on a particular output line;

control register means for establishing one of a plurality of modes of operation related to the particular input and the particular output line;

timing means for counting time intervals associated with the generation of and reception of data, dial, and control signals; and control logic means interconnecting the assembly/disassembly register, control register, and timing means whereby the interconnection of the pulse signal exchange with a device is automatically accomplished.

2. Apparatus according to claim 1 wherein said device is a circuit switched network which is connected to the pulse signal data exchange by means of one of the particular input and output lines.

3. Apparatus according to claim 2 wherein said assembly/disassembly register means includes a plurality of multiple state devices whose states are set by and controlled by said control logic means to transmit to the particular output line dial and control signals to the circuit switched network, and means for receiving control signals from the circuit switched network by the particular input line.

4. Apparatus according to claim 3 wherein the control register means includes multistable elements whose combined states generate a plurality of electrical signals one of which acts to generate and receive data in start-stop telegraph form, and one of which acts to generate and receive data in dial and control pulse form with the circuit switched network.

5. Apparatus according to claim 2 wherein the register means includes a character assembly/disassembly field in which incoming serial data from the line is assembled into a complete character and an outgoing character is disassembled into serial data, a timing field for counting off time intervals to determine when a particular action is required, and a control field which contains control information related to a particular line; and wherein the control means includes multi-stable elements whose combined states generate a plurality of electrical signals one of which acts to generate and receive data in stop-start telegraph form, and one of which acts to generate and receive data in dial and control pulse form with the circuit switched network, said control means establishes a plurality of modes of operation including a first mode in which the pulse signal exchange is connected to send and receive start-stop data with other pulse signal data exchange lines and with the circuit switched network, a second mode for generating an idle signal indication on a data signal exchange line, a third mode for generating for transmission to the circuit switched network an arbitrary pattern, such as a dial pulse pattern and a continuous marking pattern, and a fourth mode for generating for transmission and reception from the circuit switched network another arbitrary pattern such as a control pulse and a continuous spacing signal.

References Cited

UNITED STATES PATENTS

| | | | |
|---|---|---|---|
| 2,589,131 | 3/1952 | Potts | 178—4 |
| 3,141,928 | 7/1964 | Davey et al. | 178—3 X |
| 3,268,649 | 8/1966 | Locke | 178—4.1 |
| 3,300,579 | 1/1967 | Nonnemacher | 178—4 |
| 3,336,577 | 8/1967 | Frielinghaus | 178—3 X |

JOHN W. CALDWELL, Primary Examiner

B. V. SAFOUREK, Assistant Examiner

U.S. Cl. X.R.

178—3